United States Patent Office 3,420,264
Patented Jan. 7, 1969

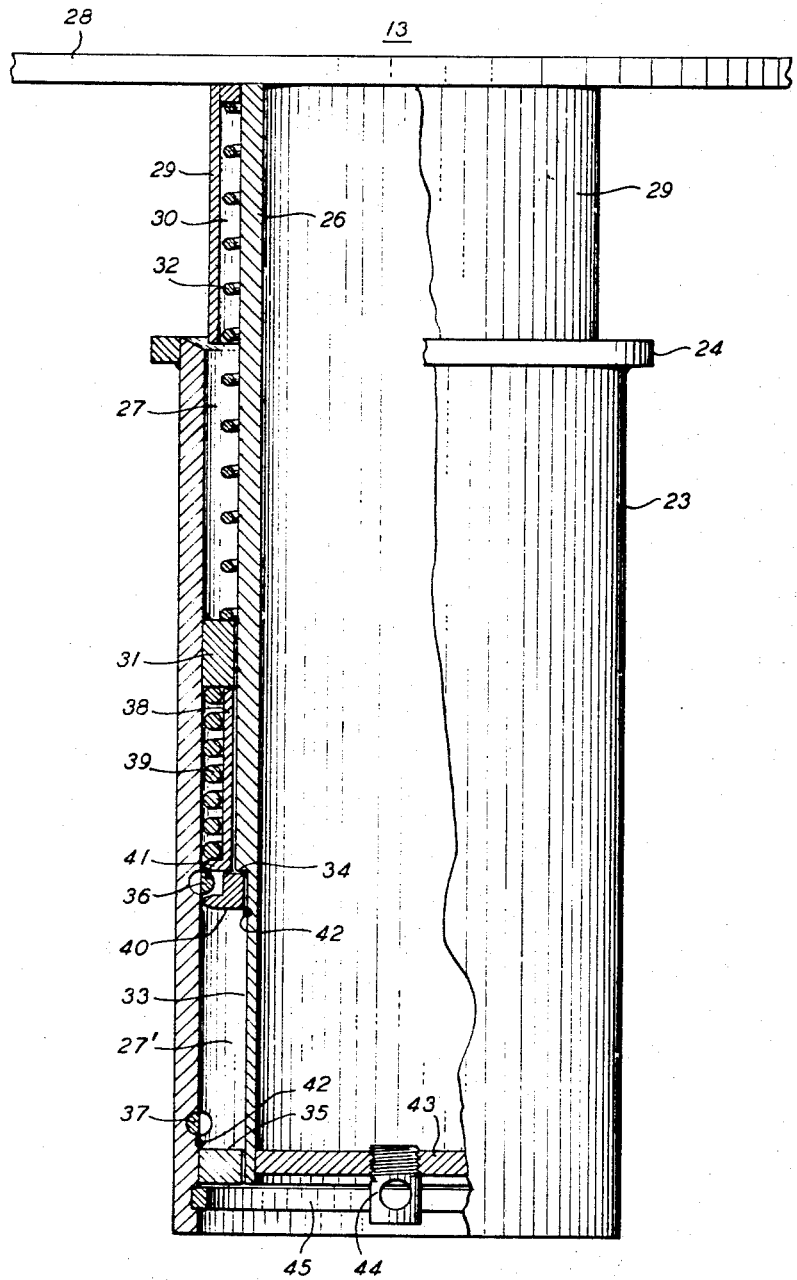

3,420,264
AIR VALVE
Jens C. Dolling, Morris Plains, N.J., assignor to Bell
Telephone Laboratories, Incorporated, New York, N.Y.,
a corporation of New York
Filed Jan. 12, 1966, Ser. No. 520,234
U.S. Cl. 137—463                           12 Claims
Int. Cl. F16k 17/04

ABSTRACT OF THE DISCLOSURE

A blast-resistant, shock-operated poppet valve includes an energy absorbing compression chamber with spring members housed therein which provide opposing forces for opening or shutting the valve.

---

This invention relates to pressure valves, and in particular, to automatic blast valves for protection purposes.

In an effort to secure equipment against sudden changes in pressure that could be caused by such things as explosions, a number of valves have been developed. The purpose of these valves is to shield or insulate the interior of buildings, people, and equipment against these sudden changes in pressure.

Most of the valves in the prior art include numerous parts, seals, and intricate moving parts. These valves are susceptible to dirt or dust and may malfunction if the moving parts bind because of debris. In addition, nonuniform pressure waves can cause bending and subsequent damage to some of the component parts which in turn results in malfunctions.

It is also known to automatically operate some of the prior art valves before a pressure wave arrives by using sensors, triggers, electronic devices or other like means. The operation of the valve thus depends upon the sensor or trigger and a malfunction of that device, or its failure to survive the pressure wave, may cause the valve to malfunction.

A malfunction, for the purpose of this disclosure, may be defined as any operation of the valve which results in the type of damage the valve was designed to prevent. If the valve fails to close, closes partially, or closes so slowly that damage results, the valve is considered to have malfunctioned.

The instant invention is embodied within a valve that presents low resistance to airflow at ambient, or unoperated conditions and is not subject to the disadvantages mentioned above. It is comprised of a simple grid system and seat in which a valve mechanism is mounted. The valve mechanism is comprised of a series of balanced springs and air chambers that may be made with large enough tolerances to allow the valve to operate in a relatively contaminated atmosphere or at an unattended station and yet allow it to operate quickly and efficiently without destroying itself.

In addition, the valve embodying the invention is capable of being operated by a sensor or automatic triggering device but is not dependent upon the same. It is adapted to operate automatically without a trigger device, using the pressure wave itself as an operating force and will operate without malfunctioning even if a trigger or sensing device is destroyed.

The invention will be more readily understood, its features and advantages more apparent, on a study of the following detailed description and drawing in which:

FIG. 1 is a partial section view of the valve mechanism;

Figure 3:
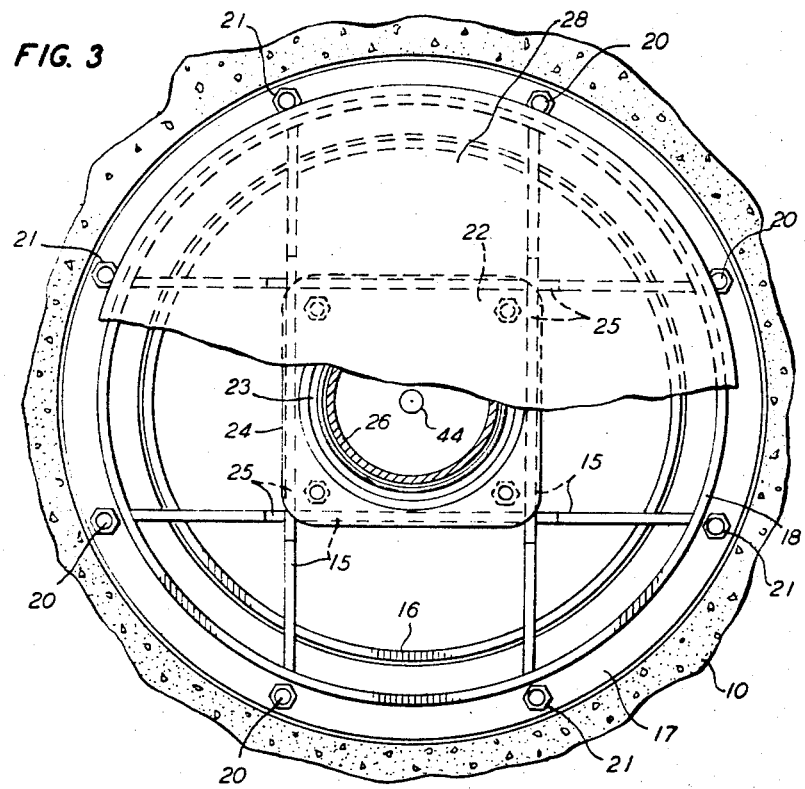
FIG. 3 is a partially sectioned plan view of the valve and valve seat.
Figure 2:
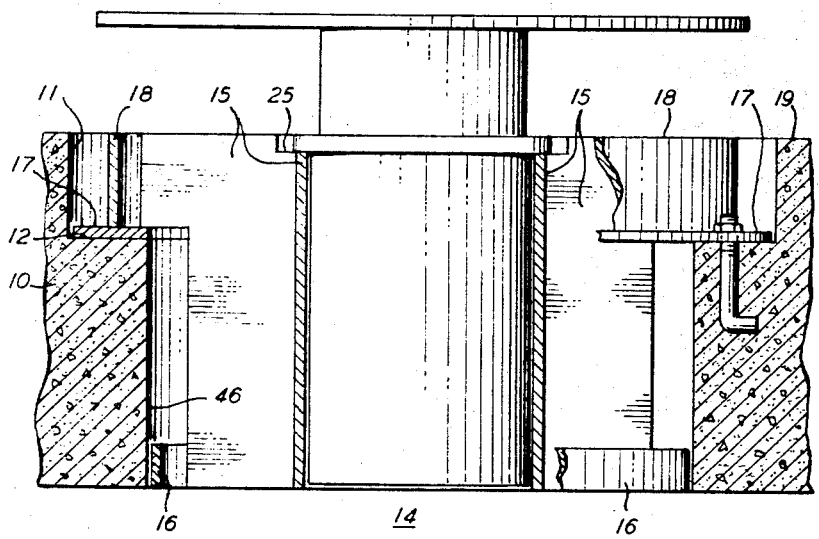
FIG. 2 is a partial section view of the valve mechanism and the valve seat.

In accordance with the various figures and in particular, with reference to FIGS. 2 and 3, the invention is embodied within a valve that is adapted to be placed within the wall or ceiling of a structure. FIGS. 2 and 3 show the valve as it appears in a concrete wall 10. The concrete wall 10 is shown only for illustrative purposes, other materials also being suitable. A generally circular aperture 11 is cut in the wall to allow the insertion of the valve within the aperture 11. The aperture 11 further includes a portion 46 of reduced diameter which results in a support ridge 12.

The valve is comprised of two major subassemblies, in particular, a valve mechanism subassembly 13 (see FIG. 1), and a valve support subassembly 14. The valve support subassembly 14 is comprised of four plates 15 that are held together in the shape of a grid by a bottom retaining ring 16 and the combination of a flange ring 17 and a valve seat 18. The outside diameter of the ring 16 is approximately equal to the inside diameter of the portion 46.

The plates 15 are rigidly attached or welded to each other and to the retaining ring 16, the flange ring 17 and the valve seat 18 in a grid as shown in FIGS. 2 and 3. The valve seat 18 is fixed to the flange ring 17 to form an inverted T-shape in cross section. The valve seat 18 is of sufficient depth, so that when it is welded to the flange ring 17, it extends to the top surface 19 of the wall 10 from the support surface 12.

The flange ring 17 includes a number of apertures through which extend mounting bolts 20. One end of the bolts 20 is imbedded within the support shelf 12 of the concrete wall 10. When the nuts 21 are threaded onto the mounting bolts 20, they hold the flange ring 17 in intimate contact with the support shelf 12 of the wall 10. Thus, the valve support subassembly 14 is rigidly mounted and attached to the wall 10 by means of the mounting bolts 20 and nuts 21, and the flange ring 17. The retaining ring 16 and the flange ring 17 also keep the valve support subassembly 14 from turning in the aperture 11. Though the aperture 11 shown in the various figures is generally circular in shape, it can also be rectangular or any other suitable shape.

As shown in FIG. 3, the plates 15 form a grid which includes an aperture 22. The aperture 22 is of sufficient size to allow the insertion of the valve mechanism subassembly 13.

The valve mechanism subassembly 13 includes a cylindrical container member 23 having rigidly fixed to one end a mounting ring 24. The member 23 is inserted in the aperture 22 formed by the grid arrangement of the plates 15. The mounting ring 24 is of sufficient size so as to overlap the adjacent grid plates 15. As shown in FIGS. 2 and 3, the top surfaces of each of the plates 15 include a notched portion 25 so that the mounting ring 24 fits flush with the unnotched portions of the top surfaces of the plates 15. (See FIG. 2.) The valve mechanism subassembly 13 is mounted to the valve support subassembly 14 by rigidly fastening, by such means as bolting or welding, the mounting ring 24 to the notched portions 25 of the top surfaces of the plates 15.

The valve mechanism subassembly 13 further includes an inner cylindrical piston member 26. The outer diameter of the member 26 is substantially smaller than the inner diameter of the container member 23. The disparity in the outer diameter of the member 26 and the inner diameter of the member 23 forms an annular space 27 between the two members.

A closure or valve cover plate 28 is rigidly attached to the top end of the cylindrical piston member 26. The plate 28 is of larger diameter than the valve seat 18. A cylindrical shielding tube 29 is positioned concentric with the member 26 and on the underside of the cover plate 28. When the valve mechanism subassembly 13 is in the open position as shown in FIG. 1, the shielding tube 29 extends from the bottom of the cover plate 28 to just below the top of the container member 23. The outer diameter of the shielding tube 29 is slightly smaller than the inner diameter of the container member 23 but the inner diameter of the shielding tube 29 is substantially larger than the outer diameter of the piston member 26. The shielding tube 29 and the piston member 26 thus form a second annular space 30 between the shielding tube 29 and the piston member 26. As shown in FIG. 1, the annular space 30 communicates with the annular space 27.

Intermediate the two ends of the container member 23, a bearing and base ring 31 is welded to the inside surface of the container member 23. The base ring 31 provides a guide and bearing surface for the outer surface of the piston member 26. It also divides the annular space 27 into an upper space 27 and a lower space 27'.

The bearing and base ring 31 performs the further function of providing a seat for a compression and opening spring 32. The spring 32 is contained within the annular space 27 and the annular space 30 and works against the top of the bearing and base ring 31 and the bottom of the cover plate 28. As the piston member 26 is inserted into the container member 23, the spring 32 is compressed and tends to force the cover plate 28 in a direction away from the mounting ring 24.

The shielding tube 29 shields the moving mechanism from debris, dust, and other deleterious materials that might be injected into the moving parts of the subassembly 13. The shielding tube 29 further encloses the annular space 27 and the annular space 30 to form an air compression chamber whose function will be described subsequently.

The piston member 26 on the opposite end from the cover plate 28 includes a reduced diameter portion 33 and shoulder 34. The containing member 23 on the opposite end from the mounting ring 24 includes on its inside surface a bearing and bottom ring 35. The latter fits snugly within the inside surface of the container member 23 and is held in place by a retaining wire 42 and a thrust ring 45. The bearing and base ring 31 and the bearing and bottom ring 35 bound the annular space 27' and forms a compression chamber. The rings 31 and 35 must operate under contaminated conditions and at temperatures where no effective lubricants are known. Sufficient tolerances between the parts are therefore included to allow for these conditions and for purposes to be described.

The container member 23 further includes an operating or locking cam 36 that is located approximately midway between the bearing and base ring 31 and the bearing and bottom ring 35. The locking cam 36 is comprised of a semicircular rod that is inserted through a hole in the edge of the container member 23. One end of the locking cam 36 includes a handle (not shown) that rotates the cam 36 about its longitudinal axis. The hole for the locking cam 36 is located so that when the circular portion of the cam 36 is lotated toward the piston member 26, the cam 36 extends into the annular chamber 27'. When the cam 36 is rotated so that its flat surface faces the interior of the container member 23, the flat surface of the cam 36 forms part of the side wall of the interior surface of the container member 23 and does not extend into the annular chamber 27'.

A second locking cam 37, similar in shape and operation to the locking cam 36 previously described, is located in the annular chamber 27' near the bearing and bottom ring 35. The locking cams 36 and 37 are shown only for illustrative purposes. The embodiment of the invention further contemplates ratchets, latches and similar means as locking devices.

The annular chamber 27' further includes a spring retainer sleeve 38, a compression and closing spring 39, and a piston ring 40. The spring retainer sleeve 38 is essentially a tubular member having a ridge 41 on one end. The ridge 41 extends from the outer surface of the sleeve 38 to approximately the inner surface of the container member 23. The compression and closing spring 39 works against the bottom of the bearing and base ring 31 and the ridge 41, as shown in FIG. 1.

The piston ring 40 is a ring that is essentially L-shaped in cross section. One leg of the L-shaped section extends from the outer surface of the reduced diameter portion 33 of the piston member 26 to approximately the inner surface of the container member 23. The ring 40 is held against the shoulder 34 by means of a retaining wire 42.

The valve may be operated either automatically or manually as desired. The valve mechanism shown in FIG. 1 is in the open position. However, nothing except the spring 32 holds the valve mechanism subassembly 13 in the open position.

The valve is operated automatically whenever a force is exerted upon the plate 28 of sufficient magnitude to overcome the resistance of the spring 32. The force is generated when the pressure on one side of the plate 28 is of greater magnitude than the pressure on the other side of the plate 28. This differential in pressure results from two main situations. The first situation is where a differential in pressure occurs when an over pressure on the outside of the wall 10 causes a flow of air toward the inside of the wall 10. As the flow of air through the valve starts, the pressure on the under side of the plate 26 drops, causing a pressure differential. The differential in pressure exerts a force upon the plate 28 which forces the piston member 26 down into the container member 23. This causes the cover plate 28 to move toward the mounting ring 24. Since the annular spaces 27 and 30 form essentially a closed chamber, any air that is included in the spaces 27 and 30 is compressed. As the piston member 26 moves down in the container member 23, the shoulder 34 forces the piston ring 40 down into the annular space 27'. The annular space 27' acts as a second compression chamber by compressing the air between the bottom of the piston ring 40 and the top of the bearing and bottom ring 35. The second situation is where a pressure on one side of the plate 28 increases faster than the pressure on the other side. Such a situation exists for a short time when a pressure wave strikes the plate 28 from above.

The compression of air in the spaces or chambers 27, 27' and 30 provides a force similar to a spring force that is exerted upon the piston member 26 as it moves down in the container member 23. The overall result is that the acceleration of the plate 28 toward the seat 18 is retarded which further results in lower forces exerted upon the seat 18 and the other parts of the device. The closing of the valve compresses the compression and opening spring 32 in the annular spaces 27 and 30 which also contribute to retarding the acceleration of the plate 28 toward the seat 18.

As shown in FIG. 1, a small calculated annular space exists between the bearing and base ring 31 and the outside surface of the member 26 and between the bearing and bottom ring 35 and the reduced diameter portion 33. The purpose of the annular spaces described above is to dissipate energy by allowing air to bleed from the chambers 27 and 27'. The bleeding of air from the chambers 27 and 27' prevents the valve from rebounding or bouncing when it is closed quickly. When the air pressure in the chambers 27 and 27' is low, the rate of bleeding is small but as the pressure increases, so does the rate of bleeding. Thus, as the valve closes, the pressure in the chambers 27 and 27' increases as the air is compressed. As the pressure increases, the air bleeds out of the chambers 27 and 27' faster so that when the valve is finally closed, a sufficient amount of air has been extracted from the chambers 27 and 27' so as to lower the pressures in the chambers 27 and 27' and prevent rebounding. As shown in FIG. 1, the air in chamber 27 is also vented to the atmosphere around the shielding tube 29.

In the mechanism 13 shown in FIG. 1, the operating or locking cam 36 prevents the spring retainer sleeve 38 from following the piston ring 40 when it is forced by the shoulder 34 down into the space 27'. This in turn prevents the compressed compression and opening spring 39 from being relieved.

When the valve mechanism subassembly 13 is in the closed position, the cover plate 28 rests upon the top surfaces of the plate 15, and a seal is formed between the under surface of the cover plate 28 and the top surface of the valve seat 18. When the under surface of the cover plate 28 comes in contact with the top surface of the plates 15 and the seat 18, the piston ring 40 is located on the bearing and bottom ring 35 side of the locking cam 37. The locking cam 37 may be interconnected, by means of levers, solenoids, and other like devices, with the piston member 26 so that when the valve mechanism subassembly 13 is in the closed position, the locking cam 37 will automatically rotate and trap the piston ring 40 between the locking cam 37 and the bearing and bottom ring 35. Since the piston ring 40 is essentially attached to the piston member 26 by means of the shoulder 34 and the retaining wire 42, the valve mechanism subassembly 13 will be automatically locked in its closed position.

The valve may be unlocked by rotating the locking cam 37 to the position shown in FIG. 1. This position will release the piston ring 40 and allow the piston member 26 to be urged toward the open position shown in FIG. 1 by the opening spring 32.

The operation of the device described above is the automatic mode of operation. The device may be manually operated by using the compression and closing spring 39. As shown in FIG. 1, the compression and closing spring 39 is of greater cross section and strength than the opening and compression spring 32. When the valve mechanism subassembly 13 is in the open position as shown in FIG. 1, the compression and closing 39 is compressed. In order to manually close the valve mechanism subassembly 13, the locking cam 36 is rotated to a position similar to that of the locking cam 37 that is shown in FIG. 1. This may be accomplished by hand or by means of a sensor, trigger mechanism, servo mechanism or similar means. The ridge 41 of the spring retainer sleeve 38 is released. Since the compression and closing spring 39 is of greater strength than the compression and opening spring 32, the spring 39 drives the sleeve 38 toward the bearing and bottom ring 35. The sleeve 38 comes in contact with the piston ring 40 forcing it toward the bearing and bottom ring 35 which, because of the retaining wire 42, carries the piston member 26 along with it. The automatic locking feature of the second locking cam 37 previously described, automatically locks the valve mechanism subassembly 13 in its closed position.

After the valve mechanism subassembly 13 has been closed by means of the compression and closing spring 39, the valve cannot be opened without compressing the compression and closing spring 39. For this purpose, a plate 43, having an attaching mechanism 44 is rigidly mounted to the interior of the piston member 26. A rod (not shown) or other means, may be attached to the attaching mechanism 44 for the purpose of pushing or pulling the piston member 26 to either the open position when the compression and closing spring 39 has been released, or to the closed position when it is not desired to use the compression and closing spring 39.

As shown in FIG. 1, a thrust ring 45 interfits with a groove in the interior surface of the container member 23. The thrust ring 45 is for the purpose of holding the bearing and bottom ring 35 in place and for providing access to the device for assembly and disassembly.

It is obvious to those skilled in the art that numerous changes and modifications may be made to the device as it has been disclosed above. However, such modifications are within the scope and spirit of the above disclosure and the appended claims.

What is claimed is:

1. A valve comprising a closure plate and a support, said support including a valve seat and a tubular guide member, said plate movable against said seat and including a cylindrical extended portion, said portion interfitting concentrically with said member and movable therein, said portion being of smaller diameter than said member and forming an annular space therebetween, closing means and opening means located in said space, both of said means operably connected to said portion and to said member, said opening and said closing means adapted to move said portion with respect to said member, said opening means operable at all times and urging said plate away from said seat, said plate being responsive to a predetermined force applied to said plate, said force overcoming said opening means and moving said plate against said seat.

2. The device described in claim 1 wherein said valve further includes operating means, said operating means selectively operating said closing means, said closing means upon being operated overcoming said opening means and moving said plate against said seat.

3. The device described in claim 1 wherein said space includes air restricting means and air compression means, the latter means operatively connected to said portion, said air restricting means metering the escape of air from said space, said compression means compressing the air in said space when said plate is moved toward said seat, the compressed air resisting the movement of said plate toward said seat, said air restricting means retarding the escape of air from said space at a rate to build pressure in said space sufficient to retard the speed of said plate toward said seat and allowing the escape of air from said space at a rate sufficient to reduce the pressure in said space to prevent rebound of said plate from said seat.

4. The valve described in claim 2 wherein said space includes air restricting means and air compression means, the latter means operatively connected to said portion, said air restricting means metering the escape of air from said space, said compression means compressing the air in said space when said plate is moved toward said seat, the compressed air resisting the movement of said plate toward said seat, said air restricting means retarding the escape of air from said space at a rate to build pressure in said space sufficient to retard the speed of said plate toward said seat and allowing the escape of air from said space at a rate sufficient to reduce the pressure in said space to prevent rebound of said plate from said seat.

5. The valve described in claim 3 wherein said valve further includes locking means, said locking means locking said portion with respect to said member when said plate is against said seat and preventing opening means from urging said plate away from said seat.

6. The valve described in claim 4 wherein said valve further includes locking means, said locking means locking said portion with respect to said member when said plate is against said seat and preventing opening means from urging said plate away from said seat.

7. A valve comprising a closure plate and a grid support, said support including a plurality of plates secured together in the form of a rectangular grid, said support including a valve seat, said support further including a tubular guide member, said plate movable against said grid and said seat and including a cylindrical extended portion, said portion interfitting concentrically with said member and movable therein, said portion being of smaller diameter than said member and forming an annular space therebetween, a closing spring and an opening spring mounted in said space, both of said springs operatively connected to said portion and to said member and adapted to move said portion with respect to said member, said opening spring operable at all times, and urging said plate away from said seat, said plate being responsive to a predetermined force applied to said plate, said force overcoming said opening spring and moving said plate against said seat.

8. A valve according to claim 7 wherein said space further includes a spring retainer and said member includes an operating cam, said operating cam selectively releasing and engaging said spring retainer to selectively operate said closing spring, said closing spring upon being operated overcoming said opening spring and moving plate against said seat.

9. The valve described in claim 7 wherein a first annular bearing is located at one extremity of said space and a second annular bearing is located at the other extremity of said space, said first and second bearings forming an annular air compression chamber, said second bearing including an annular opening between said second bearing and said portion, said opening providing an escape for air from said chamber, said chamber further including a piston, the latter operatively connected to said portion, said opening metering the escape of air from said chamber, said piston compressing air in said chamber when said plate is moved toward said seat, the compressed air resisting the movement of said plate toward said seat, said opening retarding the escape of air from said chamber at a rate to build pressure in said chamber sufficient to retard the speed of said plate toward said seat and allowing the escape of air from said chamber at a rate sufficient to reduce the pressure in said chamber to prevent rebound of said plate from said seat.

10. The valve described in claim 8 wherein a first annular bearing is located at one extremity of said space and a second annular bearing is located at the other extremity of said space, said first and second bearings forming an annular air compression chamber, said second bearing including an annular opening between said second bearing and said portion, said opening providing an escape for air from said chamber, said chamber further including a piston, the latter operatively connected to said portion, said opening metering the escape of air from said chamber, said piston compressing air in said chamber when said plate is moved toward said seat, the compressed air resisting the movement of said plate toward said seat, said opening retarding the escape of air from said chamber at a rate to build pressure in said chamber sufficient to retard the speed of said plate toward said seat and allowing the escape of air from said chamber at a rate sufficient to reduce the pressure in said chamber to prevent rebound of said plate from said seat.

11. The valve described in claim 9 wherein said member further includes a locking cam, said locking cam engaging said piston when said plate is against said seat and preventing the opening spring from urging said plate away from said seat.

12. The valve described in claim 10 wherein said member further includes a locking cam, said locking cam engaging said piston when said plate is against said seat and preventing the opening spring from urging said plate way from said seat.

References Cited

UNITED STATES PATENTS

| | | | |
|---|---|---|---|
| 3,064,552 | 11/1962 | Ersham | 98—119 |
| 3,075,448 | 1/1963 | Cohen | 137—461 |
| 3,278,154 | 10/1966 | Gundersen | 251—48 |
| 3,282,553 | 11/1966 | Bicicchi | 98—119 XR |

WILLIAM F. O'DEA, *Primary Examiner.*

W. H. WRIGHT, *Assistant Examiner.*

U.S. Cl. X.R.

98—119; 137—471, 484.2, 514, 517; 251—62, 73